K. KUEPPERS.
METHOD OF AND APPARATUS FOR FORMING GLASS TUBES.
APPLICATION FILED SEPT. 9, 1913.
1,301,714. Patented Apr. 22, 1919.
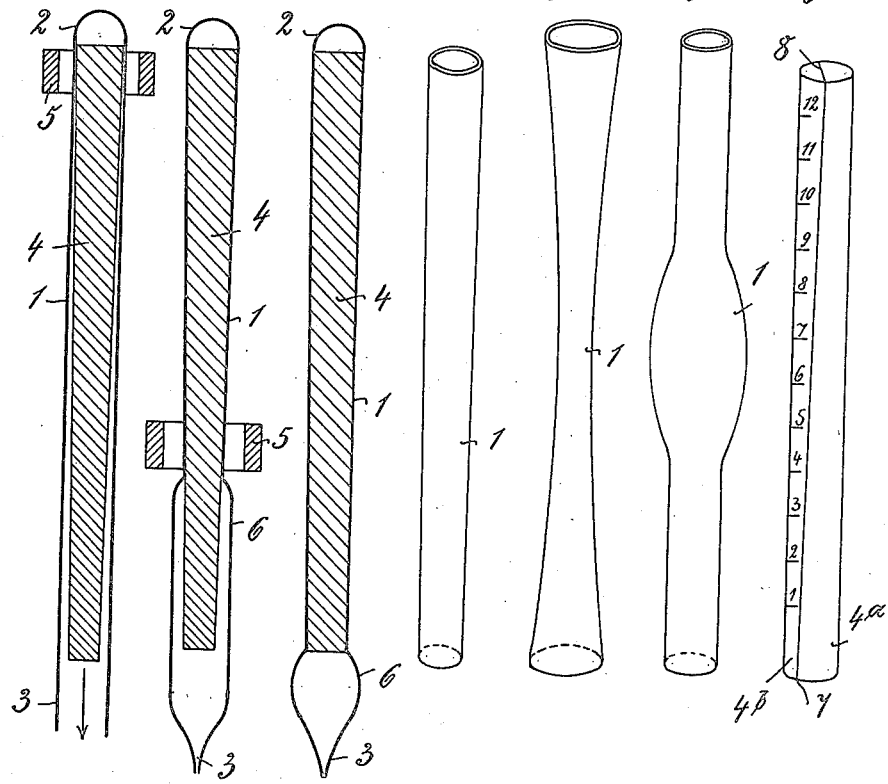

UNITED STATES PATENT OFFICE.

KARL KUEPPERS, OF AACHEN, GERMANY.

METHOD OF AND APPARATUS FOR FORMING GLASS TUBES.

1,301,714.   Specification of Letters Patent.   Patented Apr. 22, 1919.

Application filed September 9, 1913. Serial No. 788,942.

*To all whom it may concern:*

Be it known that I, KARL KUEPPERS, a subject of the King of Prussia, residing at 58 Hubertus strasse, city of Aachen, Germany, have invented a certain new and useful Improved Method of and Apparatus for Forming Glass Tubes, of which the following is a specification.

This invention relates to a method of and apparatus for forming glass or like easily fusible tubes of any desired longitudinal or transverse cross-section such, for example, as cylindrical, conical or irregularly shaped tubes either circular, elliptical, angular or of other desired shape in cross-section.

In order that the invention may be more clearly understood reference is made to the accompanying drawings whereon Figures 1, 2 and 3 are vertical sections showing the different stages of manufacture of a conical tube, while Fig. 4 shows the finished conical tube in side view. Figs. 5 and 6 show other forms of tube in side view, while Figs. 7 to 12 illustrate various cross-sectional shapes.

Fig. 13 is a side view illustrating one form of core hereinafter referred to.

Referring to Fig. 1 of the drawings: 1 designates a glass tube closed at its upper end at 2 and open at its lower end 3. Within this tube is fitted a conical core 4, shown in Figs. 1 to 3 as solid but which may if desired be hollow. After inserting the core 4 the glass tube 1 is more or less evacuated and sealed at its lower end 3 as illustrated in Fig. 2. The whole arrangement is then gradually heated. The upper end of the tube is heated externally to a red heat for a distance of about a few centimeters, so that the annular part thus heated softens. The tube may be heated by means of a metal ring 5 through which an electric current may be passed so as to heat-up the metal ring, or a coil may be wound thereon and an alternating magnetic field induced thereby or, if desired, the ring may be heated by means of gas or the like. The external air then compresses the softened part of the tube against the conical core so that it conforms to the shape thereof. The tube 1 and the ring 5 may at the same time be rotated relatively to one another by rotating either the tube 1 or the ring 5, so as to attain uniform heating and softening of the tube. Simultaneously the tube 1 and ring 5 are moved relatively to one another in the longitudinal direction by raising the tube 1 or lowering the ring 5 so that the annular softened part moves successively toward the other end of the glass tube, so that the softened part of the glass conforms to the shape of the core to form a conical tube.

Fig. 2 shows the conical tube nearing completion, the tube 1 having adapted itself to the shape of the core 4 from the upper end down to the position to which the ring 5 is moved. At the same time as the conical tube is formed, a downwardly advancing bulge 6 is formed owing to the diminution of the periphery of the glass tube as it adapts itself to the shape of the core.

Fig. 3 shows the finished conical tube, the ends of the tube being cut off after the tube has cooled, whereupon the core 4 may be readily removed.

The glass tube may also be heated in the reverse direction, that is to say, from the narrow end to the wider end, and during this process the tube 1 may be subjected to either compression or tension so as to increase or reduce the thickness of the tube. The tube may also be heated in longitudinal strips, the strip softened thereby conforming to the shape of the core and the whole tube being formed by rotating the tube about its axis. The core may also be simultaneously heated or the core alone may be heated from the exterior by means of an alternating electric current or induction current so as to heat-up the core to the desired temperature through the glass tube. The tube 1 may be filled with an inert gas such as carbon dioxid, nitrogen or the like in order to obviate any possibility of the oxidation of the metal core.

In this manner as already described, cylindrical or other shaped tubes may be manufactured as, for example, the tubes illustrated in Figs. 5 and 6, of any suitable cross-section as illustrated in Figs. 7 to 12. The core 4 may be adapted to be taken to pieces in any suitable manner and may consist of any desired material such for example that it must be destroyed in order to be removed. The whole arrangement, tube and core, may also be heated to softening either before or after evacuating. Moreover, mechanical means may be substituted for the external air pressure, for example, a rotatable roller arranged immediately behind the heating device or ring 5 so as to press the softened glass against the core. The annular heating may for example be effected by means of flames, electrical heating elements or alternating or inducing currents which directly heat the metal core. For manufacturing in large quantities a plurality of the tubes and cores may be arranged in devices which heat the tubes over their whole length until a certain temperature is attained, although in the case of uniform heating by means of the heating element 5 in Fig. 1 a rotation of the tubes 1 is not necessary. The advancing peripheral heating then commences at one end, thus forming the tube by means of a flame or other heating device 5 (Fig. 1).

After the complete formation the tubes may be cooled in a similar manner to the action of a cooling furnace. The prepared tubes may also be placed in furnaces and slowly heated until softened and formed, and then allowed to cool. In this case the device can also be so arranged that the heat supplied to one end of the device is greater than at the other end and gradually advances toward that end. The tubes may furthermore be arranged parallel to each other and passed through an alternating current or induction field, which preferably heats the individual tubes uniformly.

Tubes manufactured in the foregoing manner correspond exactly to the shape of the core so that the slightest variation in shape may be produced such as differences of one-hundredth of a millimeter or more. It is thus possible to simultaneously manufacture tubes engraved in any desired manner, for example, provided with numbers, names, graduations or the like. For this purpose the core is graduated or etched in known manner. Fig. 13 shows a graduated core in two parts so that it may be taken to pieces. The two halves 4ᵃ and 4ᵇ are of wedge shape so that their contiguous faces 7—8 are inclined to the axis of the core. The two halves 4ᵃ and 4ᵇ may be secured together in any suitable manner, as for example, by means of screws. The half 4ᵇ is provided with graduations as illustrated in Fig. 13. On the completion of the formation of the tube the halves 4ᵃ and 4ᵇ of the core are detached, whereon the half 4ᵃ may be pushed beneath the half 4ᵇ, when the latter may be removed from the tube. It is thus possible to manufacture measuring devices such as gage glasses, burettes or the like in large quantities with etchings which are exactly similar to each other. A further modification in the manufacture of such tubes consists in pushing the glass tube over a corresponding core or inserting the core in the tube, filling the tube with an inert gas in case the core is liable to oxidation and closing the tube, but not air-tight. The heating may then be carried out according to one of the methods already described, for example, by rotating the tube about its axis horizontally and moving the heating device 5 from one end to the other thereof so that the tube fuses on the core. The tube may also be softened and a core inserted therein.

It will of course be understood that any desired apparatus may be employed for carrying out the foregoing methods.

I claim:—

1. A process for the production of glass tubes of exact inner form and dimensions, which consists in mounting the tube on the outside of a suitably shaped mandrel or core of a size and shape corresponding to the size and shape to be given to the said tube, next heating the walls of the glass tube while on the mandrel sufficiently to soften the same, and while in a softened state, pressing the softened walls inwardly, in successive stages lengthwise of the tube, into conformation with said mandrel or core.

2. A process for the production of glass tubes of exact dimensions in longitudinal and in cross section, which consists in mounting the tube on a suitably shaped mandrel or core, and heating and softening the walls of the glass tube, which is more or less evacuated, said walls being then pressed into contact with said mandrel or core by the external air pressure.

3. A process for the production of glass tubes of exact dimensions in longitudinal and in cross section, which consists in mounting the tube on the outside of a suitably shaped mandrel or core, next heating and softening the walls of the glass tube while on the mandrel, said heating operation being started near one end of the tube, and progressively advancing toward the other end, and progressively pressing the softened glass inwardly into contact with said mandrel or core.

4. A process for the production of glass tubes of exact dimensions in longitudinal and in cross section, which consists in mounting the tube on a suitably shaped mandrel or core, formed in separate sections, and heating and softening the walls of the glass tube, said walls being then pressed into contact with said mandrel or core, thereafter separately removing the several sections of said mandrel or core.

5. A process for the production of marked glass tubes of exact dimensions in longitudinal and in cross section, which consists in mounting the tube on a suitably shaped mandrel or core having markings thereon, and divided longitudinally into a plurality of wedge-shaped longitudinal sections, and heating the walls of the glass tube sufficiently to soften the same, said walls being pressed into contact with said mandrel or core while in a softened condition, whereby the markings on the mandrel are imparted to the tube, thereafter separately removing the sections of said mandrel or core.

6. Apparatus for forming glass tubes of any desired longitudinal or transverse cross-section, comprising a core upon which the tube is mounted said core being of shorter length than the tube to enable the ends of the tube to be sealed, and an annular heating element adapted to surround said tube and movable longitudinally relatively thereto.

7. Apparatus for forming glass tubes of any desired longitudinal or transverse cross-section, comprising a core upon which the tube is mounted said core being of shorter length than the tube to enable the ends of the tube to be sealed and an annular heating element adapted to surround said tube and movable longitudinally and rotatably relatively thereto.

8. The method of forming etched or engraved tubes, which consists in mounting a tube upon a correspondingly etched or engraved core, partially evacuating the tube and sealing the latter, and thereupon heating the tube to softening so that the latter adapts itself to the core.

9. An apparatus for forming glass tubes, which comprises a mandrel or core of any desired longitudinal cross section, upon which the tube is mounted, said mandrel being shorter than the tube to enable the ends of the tube to be sealed, said mandrel being longitudinally divided into wedging sections, and markings upon one of said sections, and an annular heating element adapted to surround said tube and movable longitudinally and rotatably relatively thereto.

10. Apparatus for forming glass tubes of any desired longitudinal or transverse cross-section, comprising a suitably shaped mandrel or core, formed in separable sections upon which the tube is mounted, said core being of shorter length than the tube to enable the ends of the tube to be sealed, and means for heating the tube.

11. Apparatus for forming glass tubes of any desired longitudinal or transverse cross-section, comprising a suitably shaped mandrel or core having markings thereon, and divided longitudinally into a plurality of separable parts, upon which the tube is mounted, said core being of shorter length than the tube to enable the ends of the tube to be sealed and means for heating the tube.

In testimony whereof I have affixed my signature in presence of two witnesses.

KARL KUEPPERS.

Witnesses:
CARL LAUTER,
JEAN GÖBBELY.